United States Patent [19]

Kelley et al.

[11] Patent Number: 5,210,622

[45] Date of Patent: May 11, 1993

[54] AUTOMATIC VARIABLE IMAGE SHIFT FOR PRECUT TABS

[75] Inventors: Timothy J. Kelley, Farmington; Alane H. Rowold, Rochester; Mike W. Barrett, Rochester; Carol P. Parsons, Rochester, all of N.Y.

[73] Assignee: Xerox Corporation, Stamford, Conn.

[21] Appl. No.: 589,762

[22] Filed: Sep. 28, 1990

[51] Int. Cl.⁵ .................................. H04N 1/393
[52] U.S. Cl. ................................ 358/451; 358/452; 358/444
[58] Field of Search ................ 358/451, 452, 444; 355/325, 425

[56] References Cited

U.S. PATENT DOCUMENTS

| | | | |
|---|---|---|---|
| 4,674,864 | 6/1987 | Stakenborg et al. | 355/218 |
| 4,745,441 | 5/1988 | Maruta et al. | 355/218 |
| 4,819,029 | 4/1989 | Ito | 355/218 |
| 4,876,562 | 10/1989 | Suzuki et al. | 358/451 |
| 4,899,227 | 2/1990 | Yamada | 358/452 |
| 4,974,035 | 11/1990 | Rabb et al. | 355/325 |
| 5,040,079 | 8/1991 | Shimizu | 358/451 |
| 5,053,885 | 10/1991 | Telle | 358/451 |
| 5,057,937 | 10/1991 | Muramatsu et al. | 358/451 |
| 5,105,283 | 4/1992 | Forest et al. | 358/444 |

Primary Examiner—Edward L. Coles, Sr.
Assistant Examiner—Thomas L. Skoll
Attorney, Agent, or Firm—Oliff & Berridge

[57] ABSTRACT

An electronic reprographic printing system for printing on output sheets of a print job, wherein a set of electronic page images is created, such as by scanning a set of original documents, storing the electronic page images in memory, and wherein certain images are variably shifted on the output sheets. The amount of image shift is dependent upon the size dimensions of the original documents and the size dimensions of the output sheets. This size dependent shifting allows for printing onto output sheets of varying sizes, or scanning from original documents of different sizes, such as from different scanning modes. The variable image shift is particularly useful for printing on tabs where the original documents are all of a standard size, and the images are specially shifted onto the tabs during printing.

17 Claims, 12 Drawing Sheets

AUTOMATIC VARIABLE IMAGE SHIFT FOR PRECUT TABS

BACKGROUND OF THE INVENTION

1. Field of the Invention

The present invention relates to an electronic reprographic printing system for scanning from, and/or printing on pages of variable sizes. In particular, the present invention relates to an electronic reprographic system for creating an electronic image of a page, such as by scanning an original document, storing the electronic image in memory, and shifting the image based on the difference between the sizes of the original document and output stock.

2. Description of the Related Art

Current printing systems are capable of shifting an image before printing on the output stock of a print job. These printing systems commonly shift the scanned images of documents in a print job a standard distance, for creating, for example, sufficient margins for binding the final product. Copying machines are also capable of forming set margins when printing on both sides of a duplex page, the process involving shifting the image in one direction on a first side and shifting the image in the opposite direction on the second side. Image shifting devices are also capable of shifting the scanned image of a document on copying paper, depending on the direction of conveyance of the copying paper. These systems commonly shift the image a preset standard distance for the entire print job.

The related art has disclosed printing systems which allow for shifting an image during copying.

U.S. Pat. No. 4,674,864 to Stackenborg et al discloses a reproduction device which includes a method for programming the width of an image-free edge zone on a copy sheet. By pressing a particular button on the control panel, the width of an image free edge zone can be adjusted at the left and righthand sides of a copy sheet to correlate the size of an original with the size of a selected output stock.

U.S. Pat. No. 4,745,441 to Maruta et al discloses a copying machine which forms filing margins on both sides of a copy sheet by shifting a reduced version of the image from an original. The optical system scanning the original is shifted a predetermined distance away from its normal position for placing an image onto a copy sheet within the predetermined margins.

U.S. Pat. No. 4,819,029 to Ito discloses a copying machine with an image shift function which provides a defined filing margin on a copy sheet by shifting the transfer position of a document image to one edge of a copy paper.

A standard image shift across an entire print job may be sufficient when the input and output documents are all of a standard size. However, problems arise when either the input or output documents are of varying dimensions. For example, tabs, whether fullcut or precut, are of dimensions different from the rest of the output stock. Thus, a standard image shift for an entire print job would not be helpful when only certain pages, such as tabs, require a shifted image on the output document. A standard image shift for an entire print job would also not be helpful when an image shift for the entire print job is desired in addition to a special image shift for particular documents, such as tabs.

What is needed, therefore, is an electronic reprographic printing system that can apply a special image shift to particular documents of a print job based on the difference between the size of the input stock that is scanned and the size of the output stock onto which the image is transferred. Further, a flexible system is needed that can apply an image shift for an entire print job, but automatically replace the image shift applied across the job with the specialized image shift, such as when printing on tabs. Also needed is a system that not only can be programmed to recognize the location of pages requiring a special image shift, but also recognize the dimensions of these pages and variably shift the image accordingly.

While the related art recognizes image shifting for a print job, a flexible system is needed that allows for specialized image shifting, such as for tabs, that can be used in conjunction with an image shift function for an entire print job, and that allows for variably shifting the image depending upon the sizes of the input document and output stock.

OBJECTS AND SUMMARY OF THE INVENTION

Accordingly, one object of the present invention is to provide an electronic reprographic printing system which is capable of receiving an electronic image such as by scanning an image from an original document, and shifting the image on an output document.

Another object of the present invention is to provide an electronic reprographic printing system which can apply a variable image shift, shifting the electronic image a distance equal to the difference between the dimensions of the original document and the output page on which the image is printed.

Yet another object of the present invention is to provide an electronic reprographic printing system that is capable of printing a print job comprising tabs sized differently than the rest of the output stock, by scanning from original documents all of equal size.

Yet another object of the present invention is to provide an electronic reprographic printing system which is capable of applying an image shift across an entire print job, and additionally applying a special image shift for precut tabs.

Still another object of the present invention is to provide an electronic reprographic printing system that can scan different sized original documents in different scanning modes, and apply a variable image shift dependent upon the sizes of the original documents and the sizes of the output pages.

The present invention is an electronic reprographic printing system for printing pages of a print job which comprises a scanner for scanning original documents, a memory for electronically storing the images of the scanned documents, a printer for printing the electronic images on output pages, and a variable image shift for shifting the electronic images from an original document having a size dimension different from a size dimension of the output sheet on which the image is printed.

BRIEF DESCRIPTION OF THE DRAWINGS

The foregoing and other objects, features and advantages of the invention will be apparent from the following more particular description of the preferred embodiments of the invention, as illustrated in the accompanying drawings wherein.

DETAILED DESCRIPTION OF THE PREFERRED EMBODIMENTS

A. The System

Figure 1:
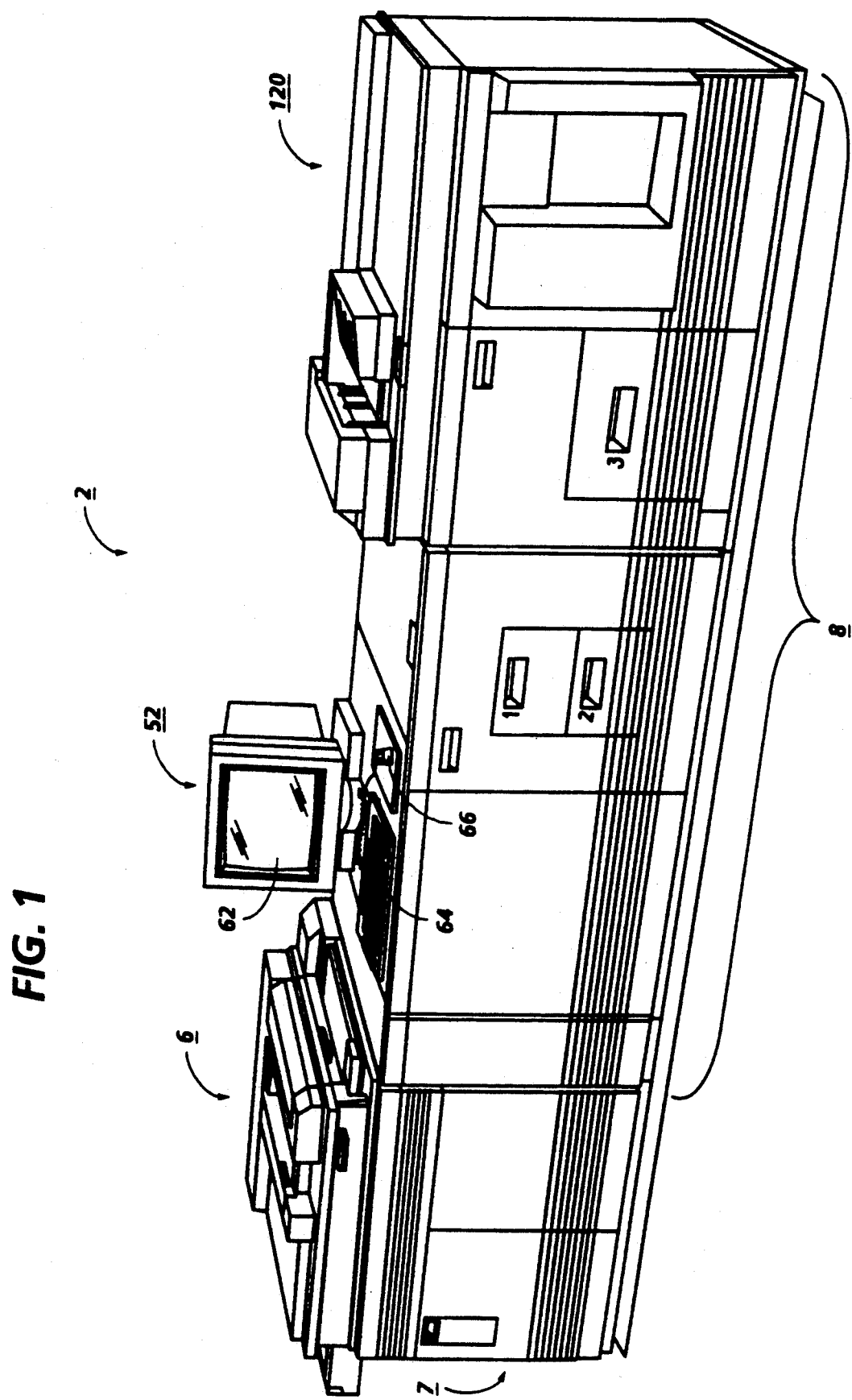
FIG. 1 is a view depicting an electronic printing system incorporating the print media identification system of the present invention.
Figure 2:
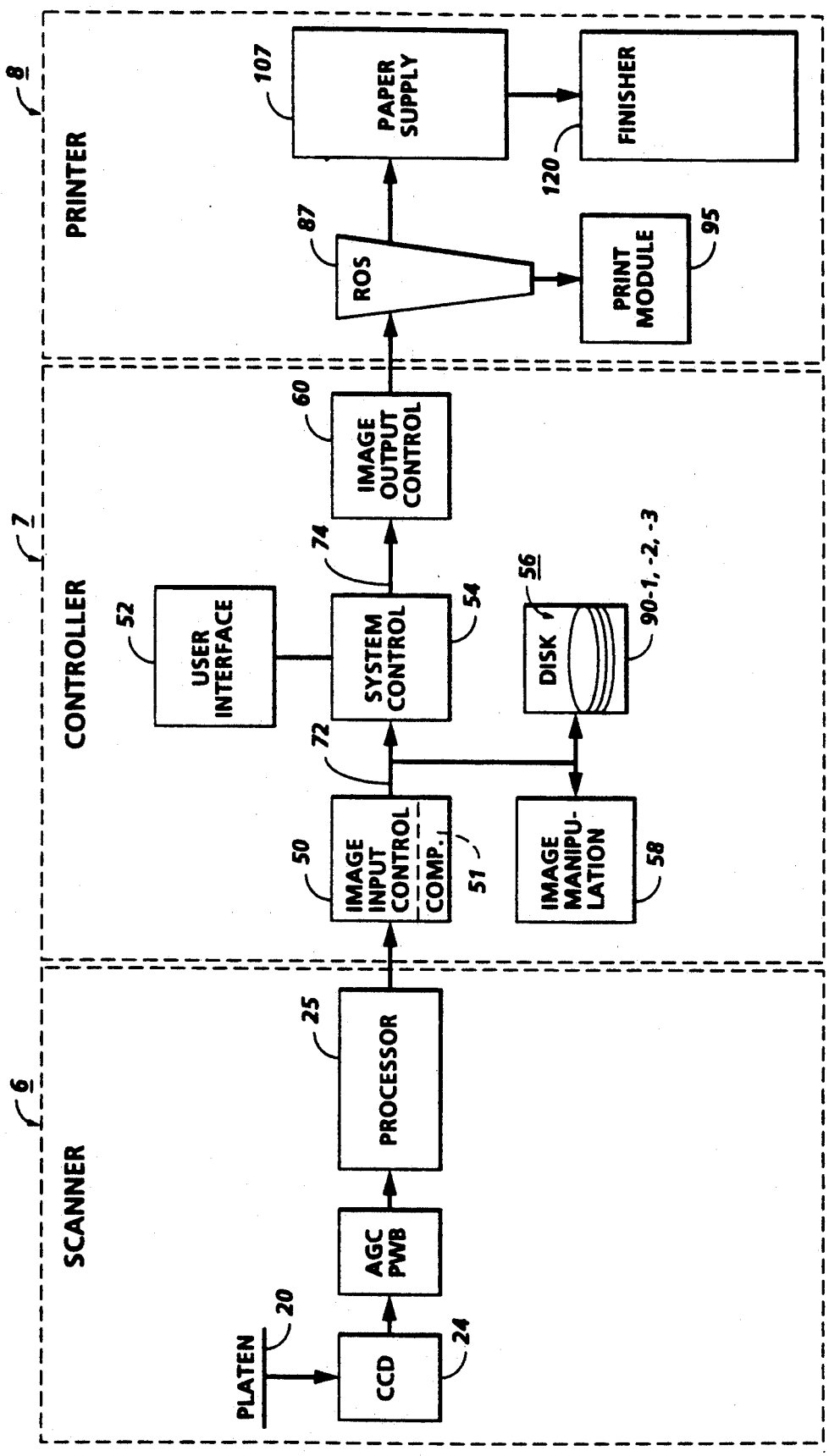
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
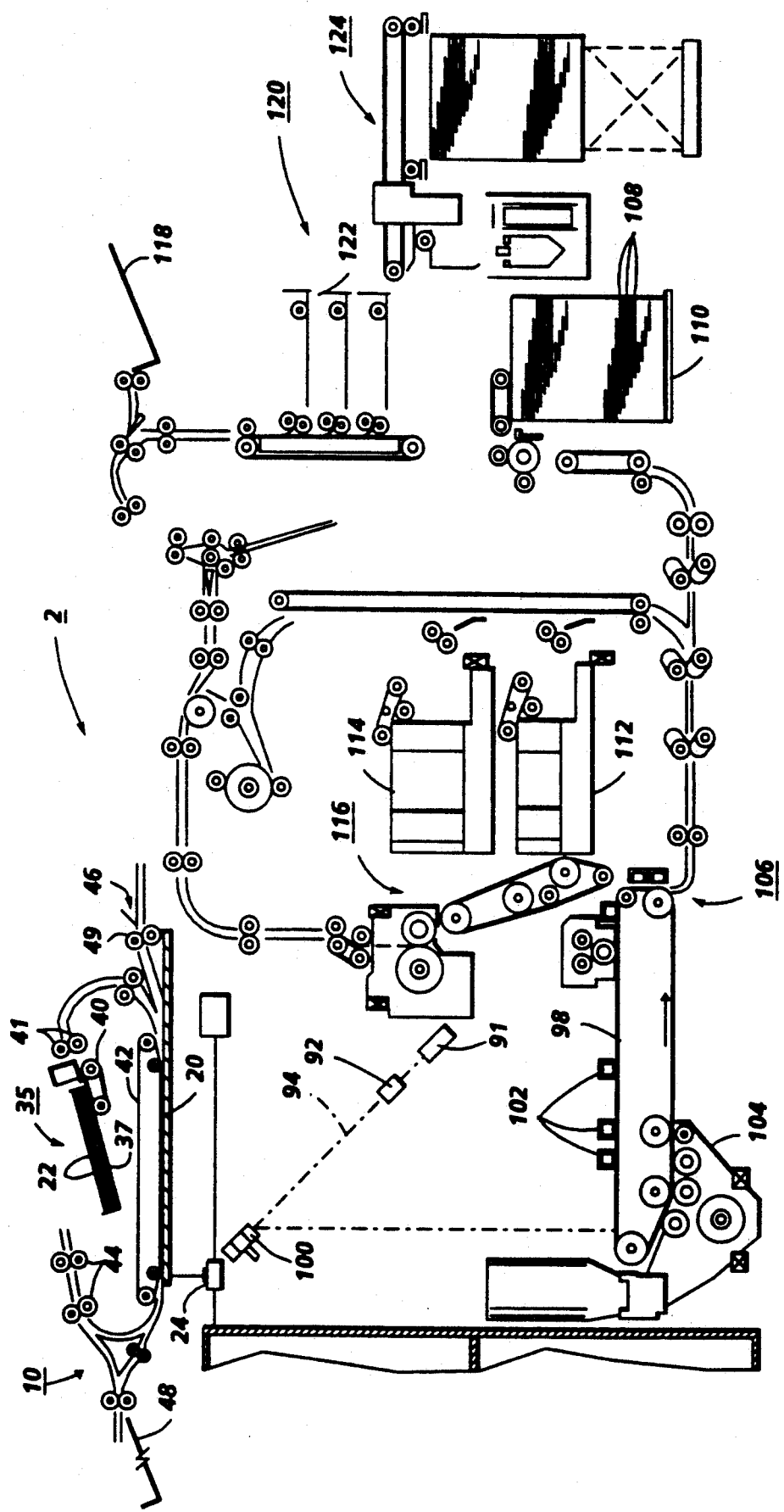
FIG. 3 is a plan view illustrating the principal mechanical components of the printing system shown in FIG. 1.
Figure 4:
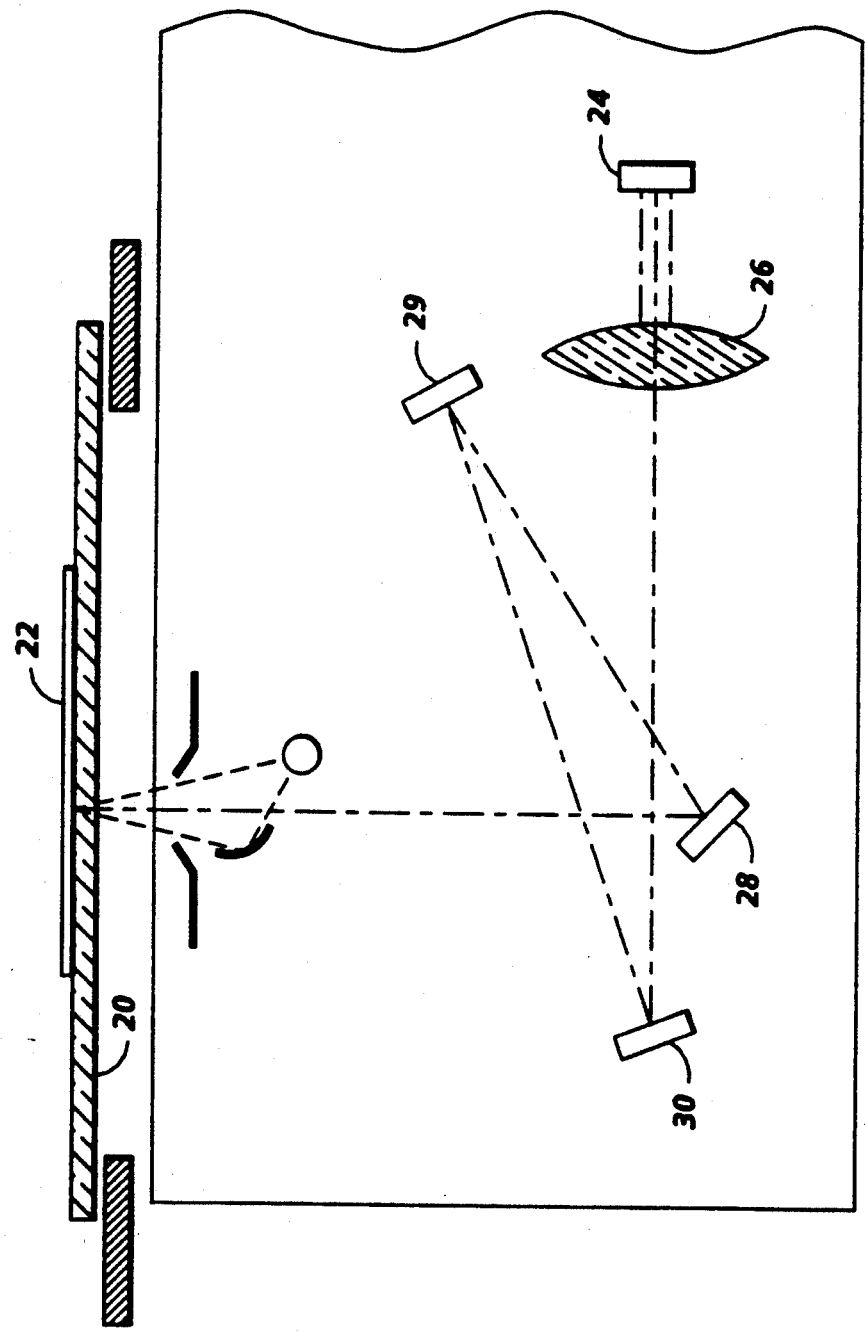
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on plate 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and crate the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 24 for adhesively binding the prints into books.

Referring to FIGS. 2 and 5, controller section 7 is, for explanation purposes, divided into an image input controller 50, User Interface (UI) 52, system controller 54, main memory 56, image manipulation section 58, and image output controller 60.

Figure 5A:
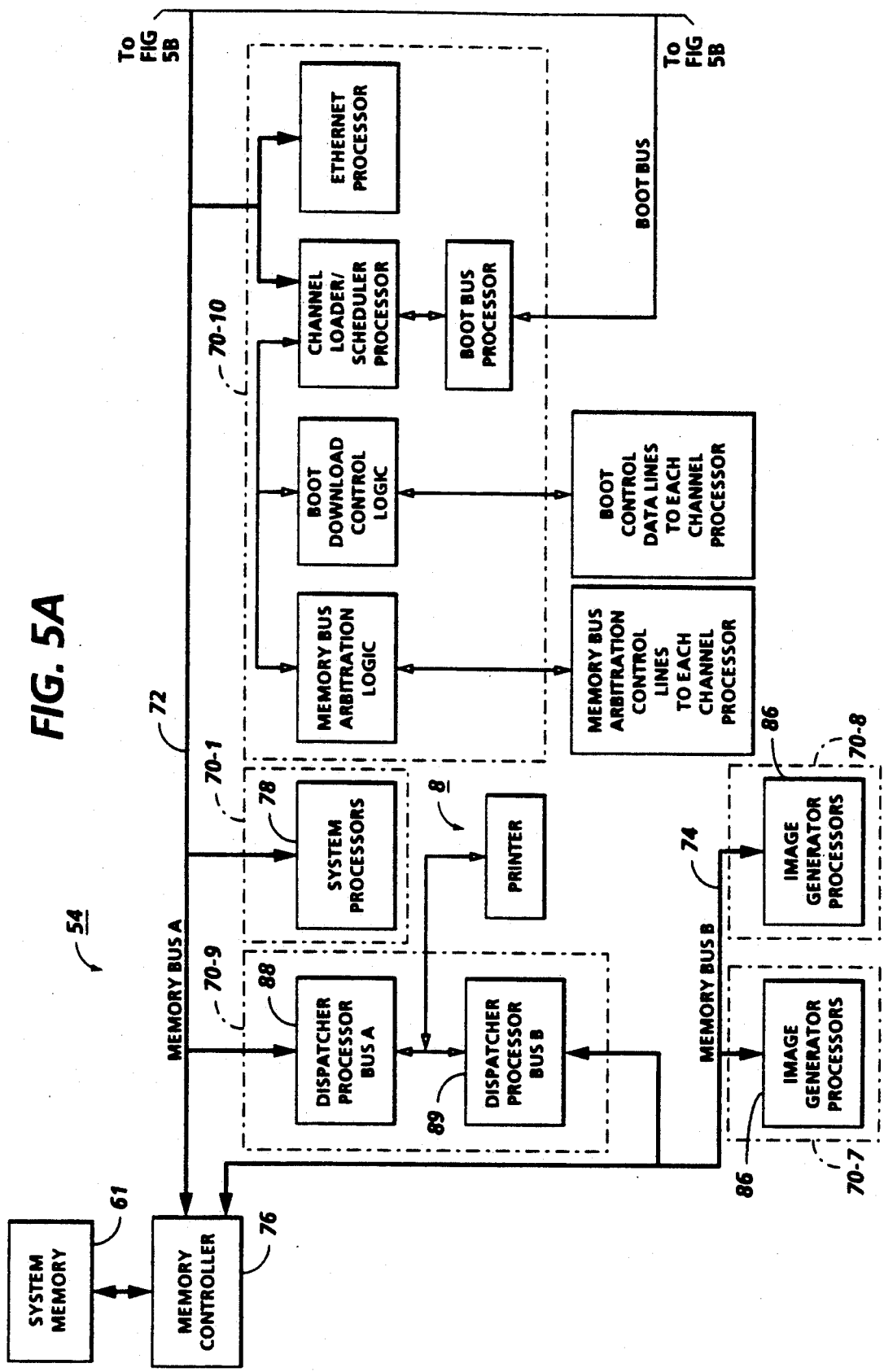
FIGS. 5a, 5b and 5c comprise a schematic block diagram showing the major parts of the control section for the printing systems shown in FIG. 1.
Figure 5B:
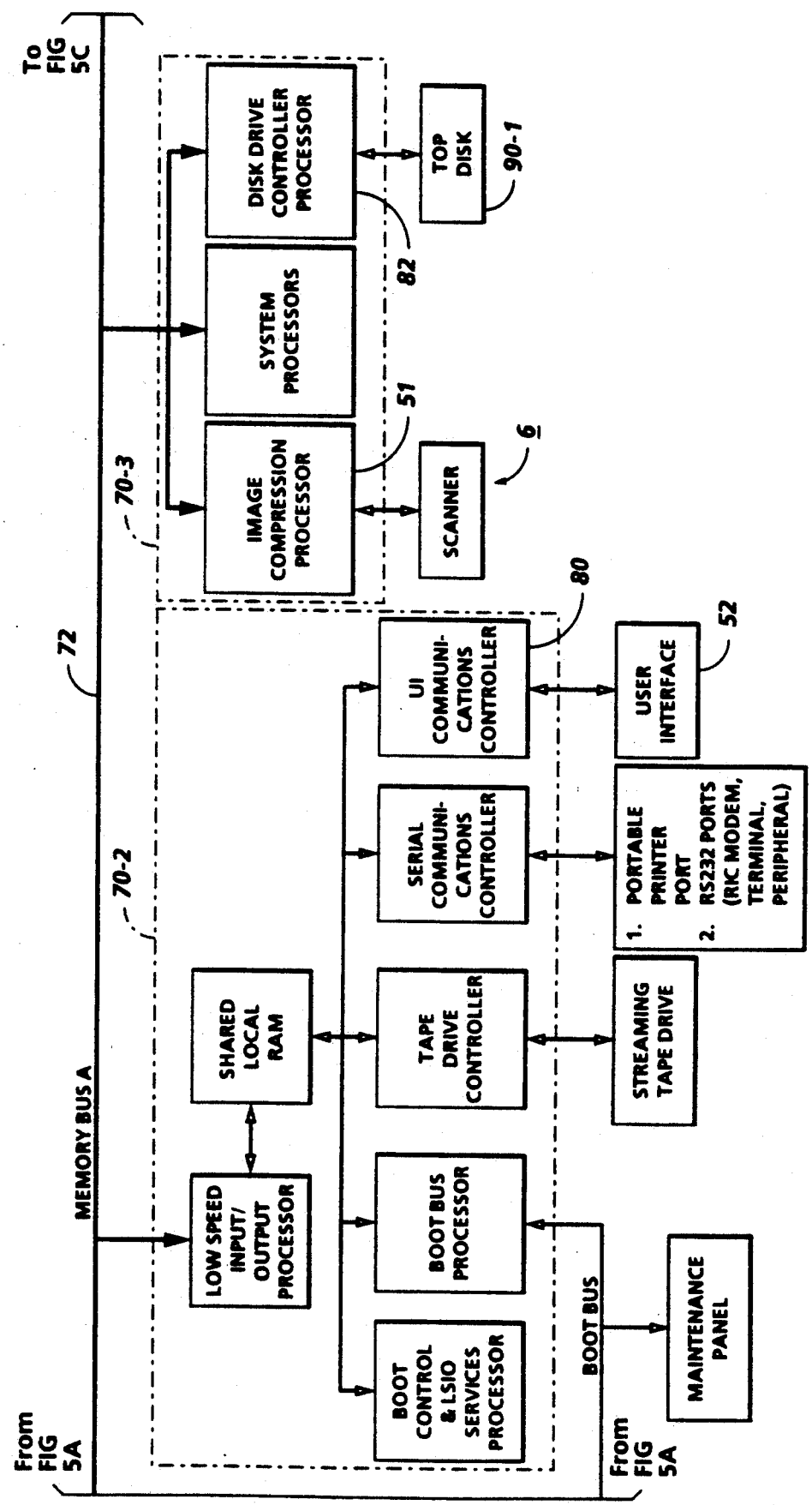
Figure 5C:
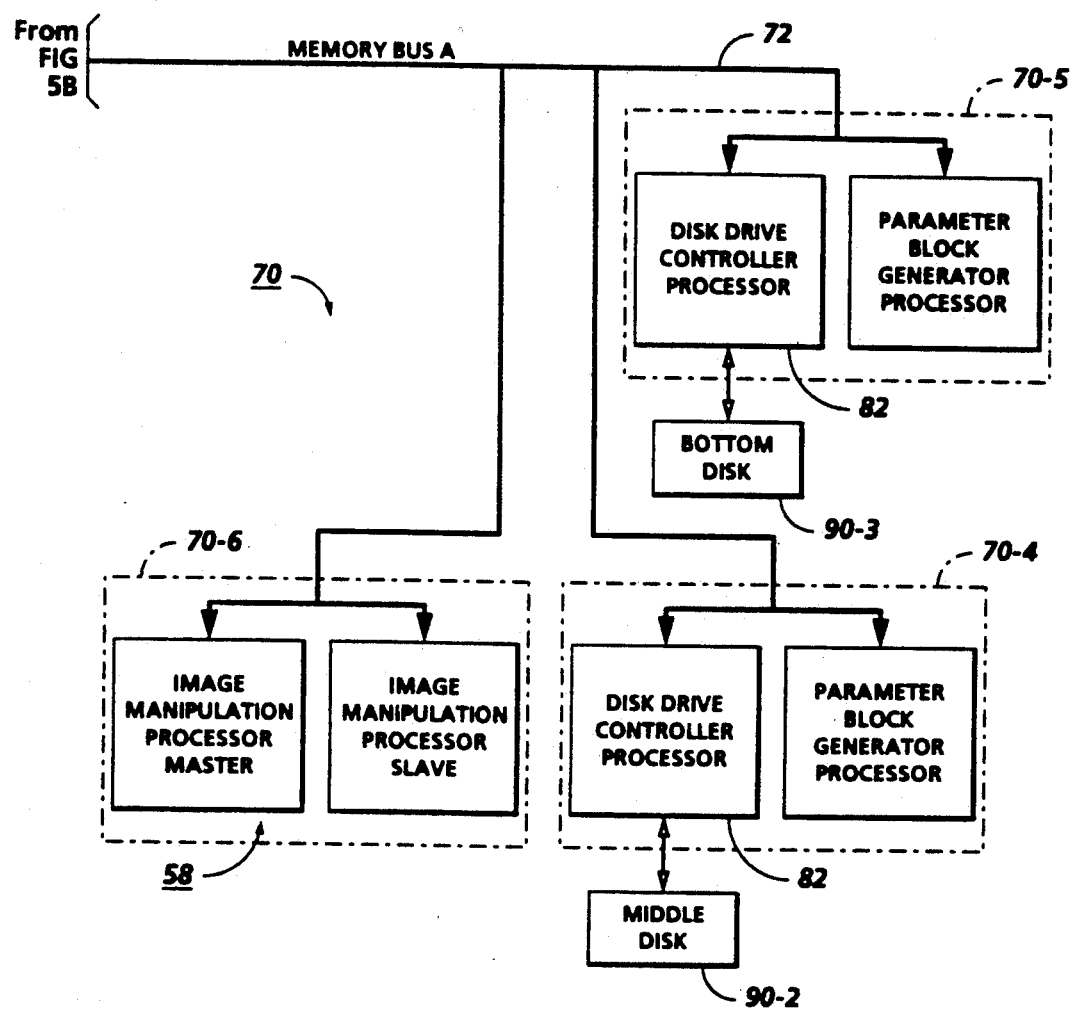

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
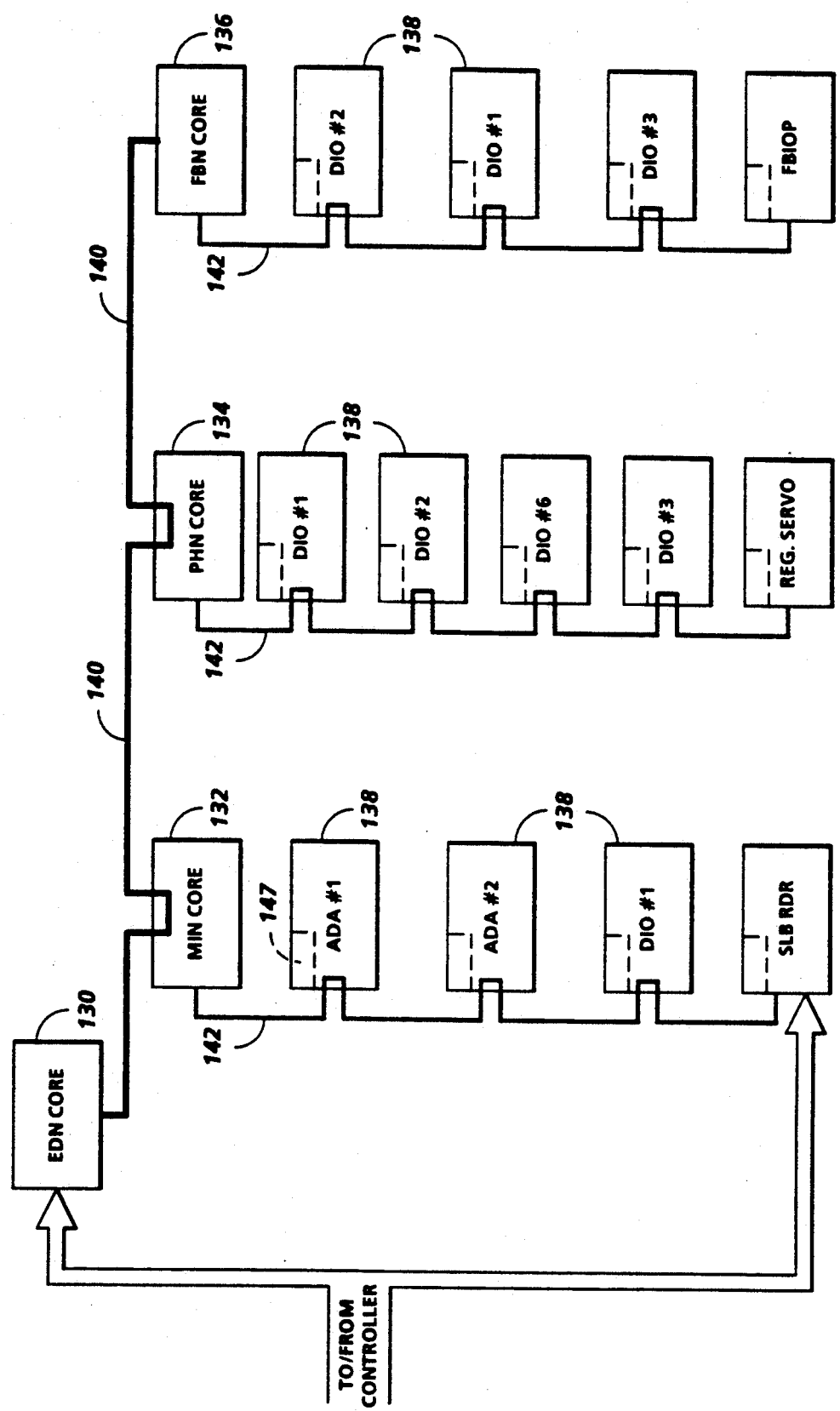
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
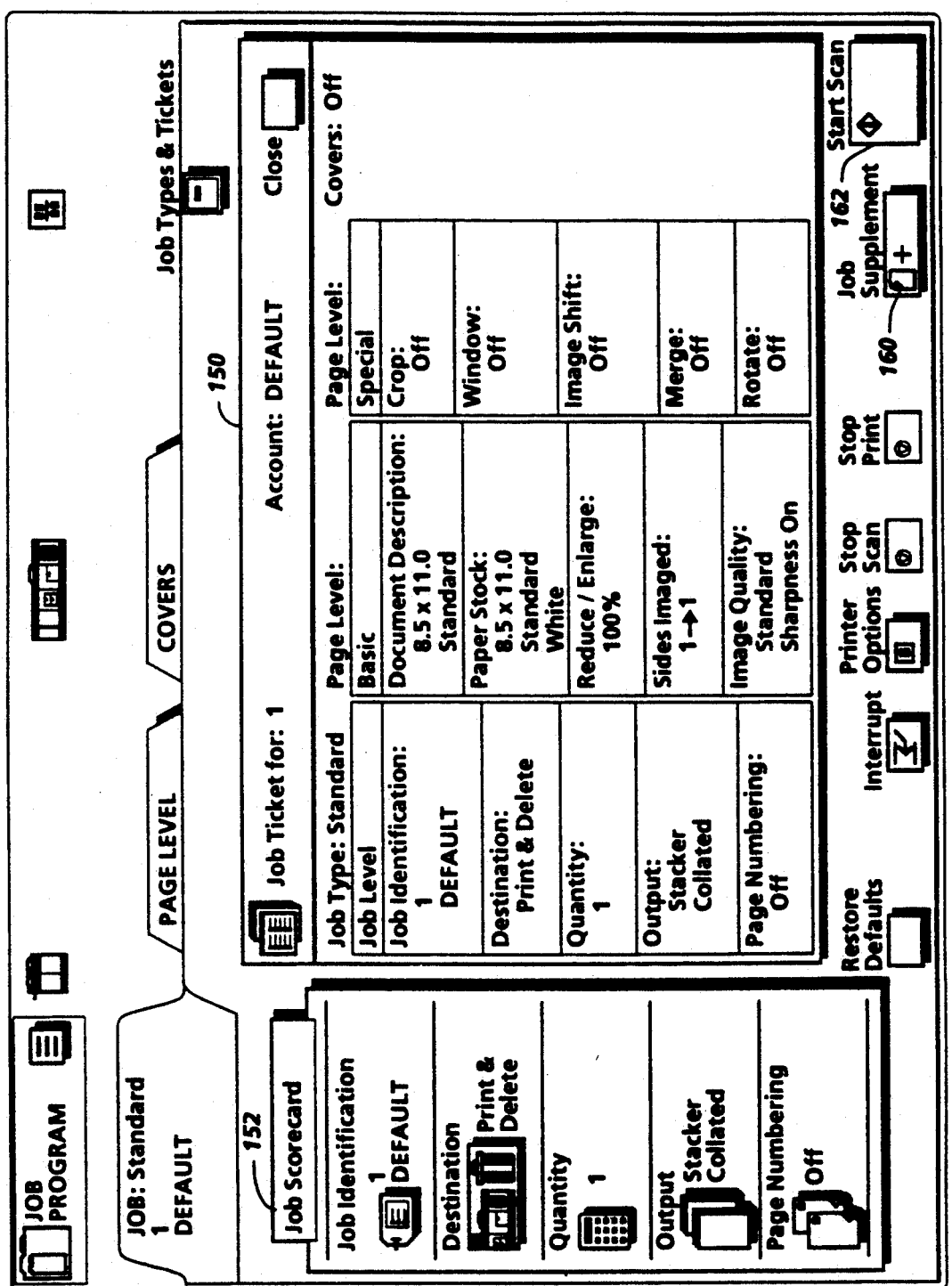
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Image Shifting

Either before or after an electronic image has been created (e.g. by scanning a document at the scanner 6), the system operator must specify which electronic image or original document is to receive the variable image shift. When printing on tabs for example the system operator can input that the output stock is to be a tab at the user interface 52 within controller 7. The system operator can specify a tab before scanning, scan the document to create an electronic image, print the electronic image on a tab, and then respecify the output stock to be a standard output page for the remainder of the scan block. By specifying a tab, the controller 7 automatically applies an image shift to the electronic image.

In the alternative, the system operator can scan the entire scan block initially, and then select via User Interface 52 particular electronic images to be printed on different sized output stock (i.e. with variable image shift). In this mode, the system operator reviews the electronic images on the User Interface and specifies the specific type of output stock, such as a full cut or precut tab, and may additionally input the specific dimensions of the input and output stock.

The sizes of the original documents and the sizes of the output documents must be specified since the degree of image shift is dependent upon the difference between the sizes of the input and output documents. If desired, it is possible to preprogram default parameters wherein the controller 7 automatically specifies sizes of the input and output documents in the event the system operator fails to input this information.

One benefit of having a size dependent image shift, such as for tabs, is that the entire print job can be scanned at one time. It is not necessary, therefore, to scan separately the pages comprising the print job and the pages to be printed on tabs. With the special image shift for tabs, all the original documents can be quickly and efficiently scanned from standard sized pages, even though the output document comprises pages of different sizes with different degrees of image shifting.

Figure 8:
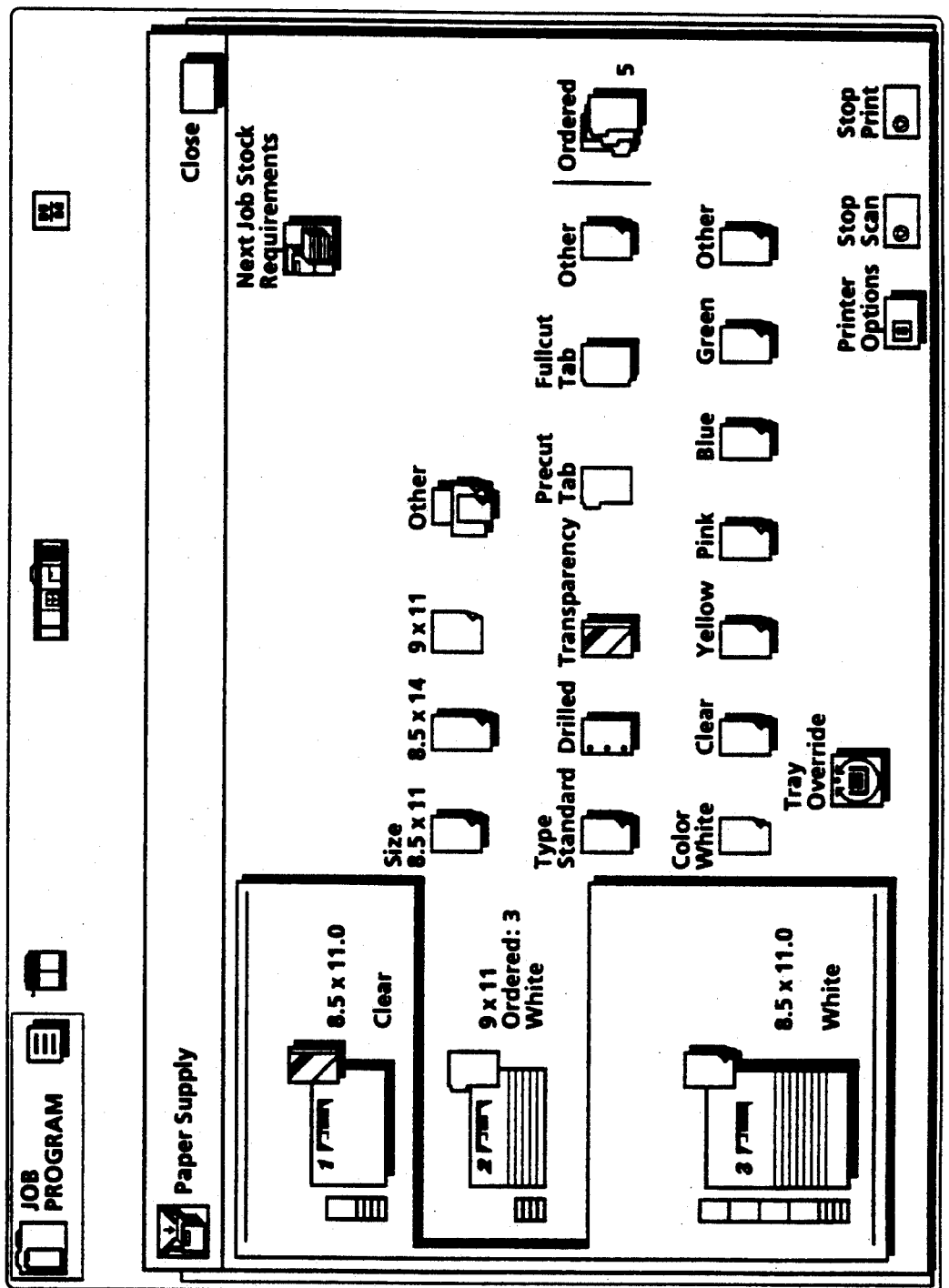
FIG. 8 shows a User Interface touchscreen with precut tabs selected as the output stock.

FIG. 8 shows a screen from the user interface 52 on which a white 9×11 precut tab has been selected. On this paper supply screen can be selected the size, color and type of stock for the print job. The system operator can indicate the location of the precut tabs within the print job by specifying the particular page or page image (pre- or post-scan), or specify the exact number of pages between tabs (the controller 7 including appropriate counters to count the number of copies to determine when a tab is to be printed). The controller can be provided with default parameters relating to the dimensions of the input documents and tab size, or the system operator can specify the stock dimensions before printing.

The size difference between the originals and the tabs is the distance that the image must be shifted onto the tab extensions. This variable image shifting effectively allows the input stock to be scanned from original documents of one standard size, if desired. For example, if the original pages are 8½×11 sheets and the output stock is to be 8½×11 sheets and 9×11 tabs, the print job can be more efficiently scanned if all the original documents (tab originals included) are scanned from the same size sheets so that two separate scan blocks are not required.

Another benefit of having a size dependent image shift is that it easily allows scanning from documents of different sizes (such as from documents scanned from different modes of the printing system). For example, the system operator may prefer to scan from one mode, such as the Recirculating Document Handler (RDH), shift to the platen mode, feed to the Semi Automatic Document Handler (SADH), return to the RDH, etc. Since the images from the tab originals are stored digitally, the mode by which the originals are scanned can thus be varied, and the documents only have to be scanned once during a print job. It is thus more desirable for the scanned images to be shifted a variable distance depending upon the dimensions of the original and output documents, (rather than shifting standard preselected distance, for example) since scanning from different modes would allow the input documents to be of different sizes.

Figure 9:
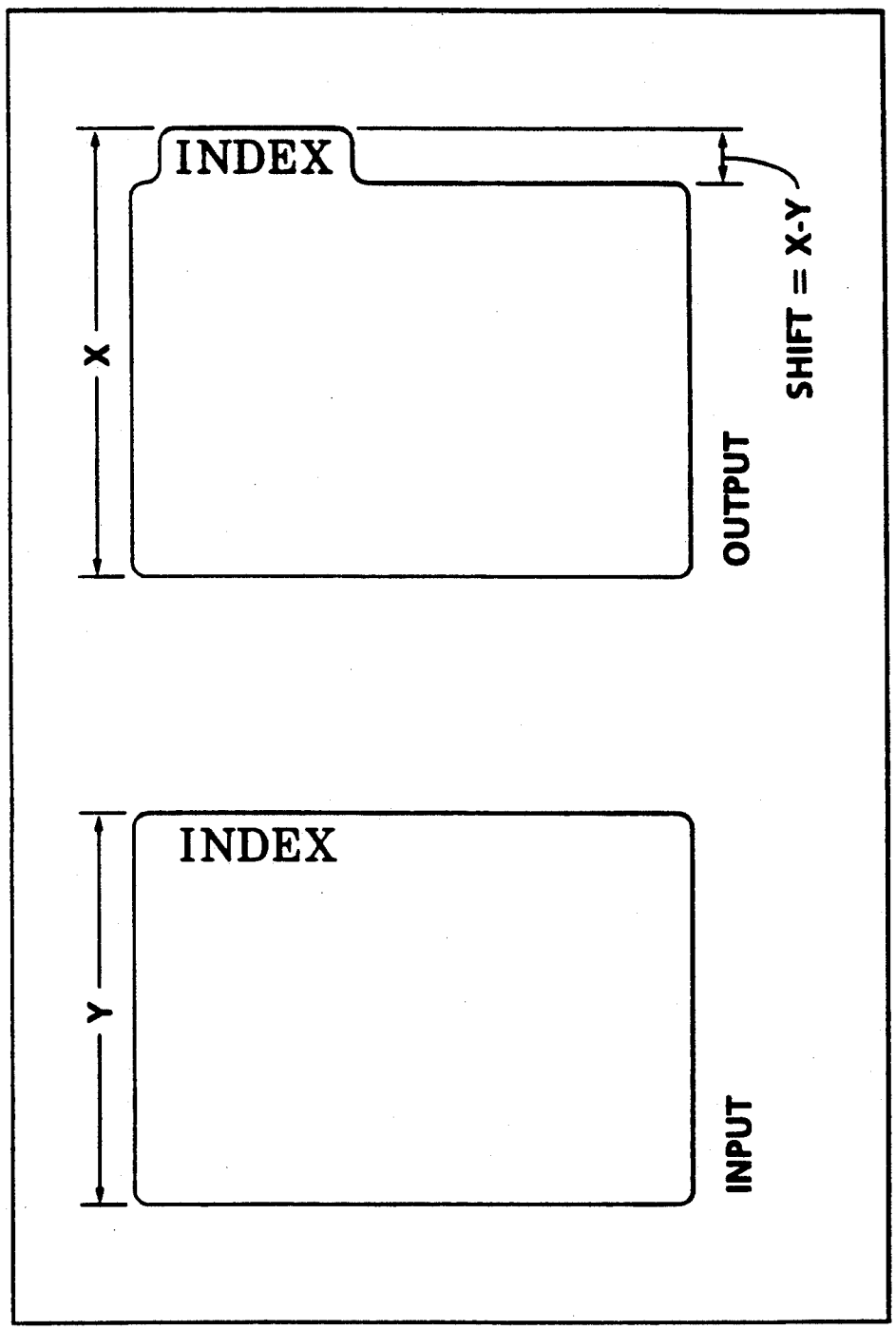
FIG. 9 shows an image shift on a precut tab, the image shifted to the right a distance equal to the difference in width of the original document and the tab.
Figure 10:
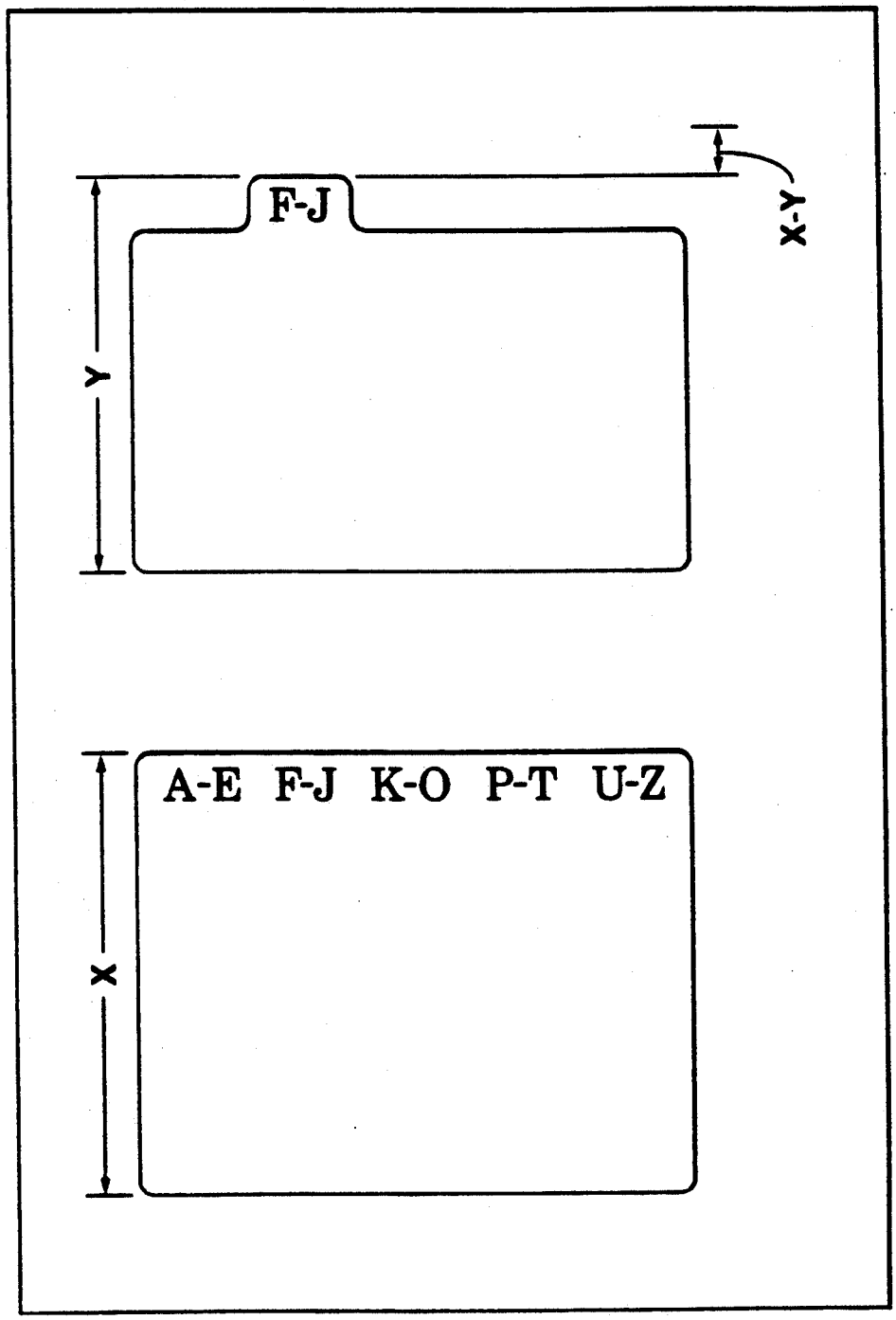
FIG. 10 shows an image shift on a precut tab, the image shifted to the left a distance equal to the difference in width of the original document and the tab.

Thus, if printing on a tab, for example, to ensure that the image on the tab is in the proper location, instead of the controller shifting a page image a standard preselected distance, the difference is calculated as the difference between the input and output stock sizes, and the image is shifted by the controller accordingly. As an example, in FIG. 9, if the document description (e.g. the width x of the original document) is smaller than the tab width y on which the scanned images will be printed, then the images will be shifted by the controller 7 to the right a distance equivalent to the difference between the width of the two documents (x-y). On the other hand, as in FIG. 10, if the document description width x is wider than the tab width y, then the images will be shifted by the controller 7 to the left. When the controller 7 calculates the automatic variable image shift, the last selected document description or crop size and paper stock will be used for this calculation.

The automatic image shift for tabs can be used in conjunction with an image shift applied for an entire print job. Thus, a standard image shift for a print job can be used in conjunction with the automatic image shifting, such as described herein, with the variable shift taking precedence over the standard print job image shift. The system operator can respecify the job image shift for a tab by reprogramming the image shift. If the tab stock selection is inactivated, the automatic image shift for tabs will be removed only if the operator has not changed the amount of image shift for the tab. Thus, if the tab image shift was altered by the system operator, then the altered image shift will remain.

While this invention has been described in conjunction with specific embodiments thereof, it is evident that many alternatives, modifications and variations will be apparent to those skilled in the art. For example, the invention has been described with reference to differences in document width and corresponding horizontal image shifts, but the invention is equally applicable to differences in document height with corresponding vertical image shifts. The invention has also been described as being applicable to printing on tabs, however the image shift is adaptable to any output stock that might dimensionally differ from the rest of the print job.

Additionally, other methods of identifying which original document image is to be variably shifted are envisioned, such as by specifying the page number of the original document image or by automatically determining the image shift from an electronically readable code. Further, the invention has been described as being applicable to shifting electronic images that have been created by scanning directly at a scanner at the reprographic system location. However, the invention is adaptable for use with a networked reprographic system having remote user work stations.

Accordingly, the preferred embodiments of the invention as set forth herein are intended to be illustrative, not limiting. Various changes may be made without departing from the spirit and scope of the invention as defined in the following claims.

What is claimed is:

1. An electronic reprographic printing system for printing on output sheets of a print job, comprising:
   means for scanning images of a set of original documents comprising a print job;
   means for electronically storing in memory images of the scanned documents;
   means for variably shifting the image of at least one of said stored electronic images for subsequent printing a distance equal to a dimensional difference between the original document from which the electronic image is scanned and the output sheet onto which the image is printed; and
   means for converting the images to a corresponding set of output sheets for printing with a portion of said at least one image to be printed being printed in a region of an output sheet which is defined at least in part by said dimensional difference.

2. The electronic reprographic printing system of claim 1, further comprising means for specifying which images of the original documents of said print job are to be variably shifted.

3. The electronic reprographic printing system of claim 1, wherein the dimensional difference is measured as the difference between the width of the original document and the corresponding width of the output page.

4. The electronic reprographic system of claim 1 wherein the means for variably shifting the image shifts the image in one direction in response to a positive dimensional difference, and in an opposite direction in response to a negative difference.

5. The electronic reprographic system of claim 1 wherein the output sheet is a tab, and the dimensional difference is the difference between the width of the tab including the tab extension and the corresponding width of the input document.

6. An electronic reprographic printing system for printing on output sheets of a print job, comprising:
   means for scanning images of a set of original documents comprising a print job;
   means for electronically storing in memory images of the scanned documents;
   means for variably shifting the image of at least one of said stored electronic images for subsequent printing a distance equal to a dimensional difference between the original document from which the electronic image is scanned and the output sheet onto which the image is printed; and
   means for shifting the remaining images a standard distance different from the variably shifted distance of the at least one stored electronic image, whereby a portion of said at least one image to be printed is printed in a region of an output sheet which is defined at least in part by said dimensional difference.

7. The electronic reprographic printing system of claim 6 further comprising means for specifying which images of the original documents of said print job are to be variably shifted.

8. The electronic reprographic printing system of claim 6, wherein the dimensional difference is measured as the difference between the width of the original document and the corresponding width of the output sheet.

9. The electronic reprographic printing system of claim 6 wherein the means for variably shifting the image shifts the image in one direction in response to a positive dimensional difference, and in an opposite direction in response to a negative dimensional difference.

10. The electronic reprographic printing system of claim 6, wherein the output sheet is a tab, and the dimensional difference is the difference between the width of the tab including the tab extension and the corresponding width of the input document.

11. The electronic reprographic printing system of claim 10, wherein the tab is a precut tab or a fullcut tab.

12. A method for controlling the printing of a print job, the step comprising:
    creating a set of electronic page images for the print job;
    electronically storing in memory the electronic page images;
    variably shifting the image of at least one of the stored electronic images for subsequent printing a distance equal to a dimensional difference between the specified size of the electronic page image and the size of the output sheet onto which the page image is printed; and
    converting the electronic page images to a corresponding set of printed output sheets, whereby a portion of said at least one image to be printed is printed in a region of the output sheet defined at least in part by said dimensional difference.

13. The process according to claim 12, further comprising the step of specifying which electronic page images of the print job are to be variably shifted.

14. The process according to claim 12, wherein the dimensional difference is measured as the difference between the width specification of the electronic page image and the corresponding width of the output page.

15. The process according to claim 12 wherein the step of variably shifting the electronic page image comprises shifting the electronic page image in one direction in response to a positive dimensional difference, and in an opposite direction in response to a negative dimensional difference.

16. The process according to claim 12, wherein the output sheet is a tab and the dimensional difference is the difference between the width of the tab including the tab extension and the corresponding width specification of the electronic page image.

17. The process according to claim 12, further comprising the step of shifting the remaining electronic page images a standard distance different from the variably shifted distance of the at least one stored electronic page image.

* * * * *